Patented Feb. 6, 1945

2,368,806

UNITED STATES PATENT OFFICE 2,368,806

RETARDING DECOMPOSITION OF PEROXIDE VAPORS

Gerhard A. Cook, Snyder, N. Y., assignor to Carbide and Carbon Chemicals Corporation, a corporation of New York No Drawing. Application November 24, 1942, Serial No. 466,829

4 Claims. (Cl. 23—207.5)

The invention is concerned with a method for retarding surface decomposition of peroxides in the vapor state, and more particularly it relates to container and reaction vessels which in contact with vapors of hydrogen peroxide and other unstable peroxides have a relatively low tendency to promote decomposition of these compounds.

Hydrogen peroxide, and peroxides generally, are considered to be very unstable compounds, particularly in their vapor state and at elevated temperatures. The readiness of these compounds to decompose is believed to be largely due to surface reactions, and it is known that surfaces contacting with hot peroxide vapors exert considerable influence on their stability. Some surfaces, including those ordinarily present in chemical apparatus, promote rapid decomposition of the peroxide. In the preparation and recovery of peroxides by processes in whole or in part in the gas phase, and in some chemical uses of these materials, it is necessary, or desirable, to work and operate with the products in the vapor state at high temperatures, and to confine the vapors within a limited space bounded by contacting surfaces. The need to reduce the decomposition rate under these conditions is apparent, and it is the object of this invention to provide a new, reliable, and improved means for accomplishing this purpose.

I have found certain surfaces which in contact with peroxide vapors have a relatively slight tendency to decompose the peroxides. These surfaces can be formed by treating the interior of vessels which are to contain or come in contact with such vapors, and they consist essentially of applied coatings of boric acid, boric oxide, or other borate containing compounds. The body of the vessel may consist of any material which is capable of withstanding the temperatures contemplated in use, and which will retain a smooth and adherent, dried, baked or fused coating of the compounds indicated. Vessels composed of ceramic material, highly refractory glass, or metal lined with porcelain enamel are well adapted to the coating treatment, and are particularly suited as a base for a fused boric acid lining, which constitutes a preferred type of contact surface.

Other compounds which have given desirable surface coatings, either alone or in mixture with boric acid are the borates of aluminum, ammonium, copper, nickel, manganese, silver and zinc; and a favorable action has also been obtained with coatings formed from mixtures of boric acid with oxides of beryllium, cerium, columbium, germanium, phosphorus, samarium, thorium, tin, titanium, and zinc; or mixtures of boric acid with ammonium silicotungstate, boron nitride, amorphous boron, and borotungstic acid. In these modified coating mixtures, however, it is believed that the favorable effects of the resulting surface are due largely to the presence of boric acid or boric oxide. Metal oxides and borates which might be reduced to the metal under the conditions of use should be avoided as surfacing materials, since bare metals, or known oxidation catalysts like vanadium pentoxide, will accelerate the vapor decomposition. It is also quite essential that the borates used in the coating, as well as the base materials to which the coating is applied, be low in, or free from alkali.

There are several convenient ways of applying these coatings to the interior of a vessel, such as by dissolving boric acid or oxide in water, rinsing the vessel with the solution, and then drying; by forming boric acid in situ by the hydrolysis of ethyl borate with water vapor; or by heating methyl borate, evenly deposited on the surface, to a temperature of about 600° C. Boric acid, or other coating compounds, can be suspended in an organic liquid such as acetone, and the latter blown out as a vapor after rinsing the vessel with the suspension; or a powdered coating compound can be mechanically distributed on the interior of a vessel which has been heated before treatment. As applied by any of these methods adherence of the coating can be improved by finally fusing it at a temperature of 300° C. or higher, and although a coating dried at lower temperatures may be suitable for some purposes, a smooth, fused coating appears to be more permanent in its favorable action.

The effectiveness of these contact surfaces can be readily determined simply by passing peroxide vapors into, or through, similar heated vessels both with and without the coating indicated, and comparing by measurement the decomposition occurring in both types of vessels. Many tests have been made, for example, in which nitrogen gas at atmospheric pressure and at a temperature of about 200° C. was mixed with small quantities of hydrogen peroxide vapor and the mixture passed through tubular vessels both with and without an interior coated surface. The tubes were mounted in a furnace having a 12-inch heating length, and with a gas flow into the tubes of between 3 cu. ft. to 6 cu. ft. per hour, the effluent gases were passed through a cold water scrubber to absorb the hydrogen peroxide which was not decomposed. Using a 13 mm. inside diameter refractory glass tube, consisting essentially of 96% SiO$_2$ and 4% B$_2$O$_3$, and with the interior surface lightly scratched, 37% of the hydrogen peroxide vapor introduced to the tube was decomposed at 300° C. At 400° C. a decomposition of 51% occurred. The same tube after applying a fused boric acid interior coating allowed a decomposition of only 8% of the hydrogen peroxide vapor at 300° C., and a 20% decomposition at 400° C. Tests under the same conditions with a ½ inch inside diameter steel tube lined with vitreous enamel showed a decomposition before boric acid coating of 87% at 400° C., and after coating only 20% at the same temperature.

Further examples of the effectiveness, and important uses, of vessels coated in accordance with the invention are shown in my copending applications Serial Nos. 415,647 and 461,125, filed October 10, 1941, and October 7, 1942, respectively, wherein such vessels are employed to great advantage in the thermal gas-phase synthesis of hydrogen peroxide. Other valuable applications are contemplated, both in processes for making peroxides, as well as in their uses under temperature conditions where decomposition of the vapors would normally be too rapid for useful purposes. The claims, accordingly, are to be interpreted broadly, with respect to their operativeness with a wide variety of shapes and sizes of vessels useful as storage containers, reaction tubes, vapor conduits, or the like, where peroxide in vapor form is to be handled.

I claim:

1. Method of retarding the decomposition of peroxide vapors by surface reactions at elevated temperatures which comprises contacting said vapors during subjection to elevated temperature with surfaces coated with a member of the group consisting of boric acid, boric oxide and difficultly reducible borate compounds which are fusible to a smooth surface and substantially free from alkali.

2. Method for retarding the decomposition of peroxide vapors by surface reactions at elevated temperatures which comprises contacting said vapors during subjection to elevated temperature with surfaces coated with boric acid.

3. Method for retarding the decomposition of hydrogen peroxide vapors by surface reactions at elevated temperatures which comprises contacting said vapors during subjection to elevated temperature with a smooth surface coating fused to a highly refractory glass, said coating being composed of a member of the group consisting of boric acid, boric oxide and difficultly reducible borate compounds which are fusible to a smooth surface and substantially free from alkali.

4. Method for retarding the decomposition of hydrogen peroxide vapors by surface reactions at elevated temperatures which comprises contacting said vapors during subjection to elevated temperature with a smooth surface coating of boric acid fused to a highly refractory glass.

GERHARD A. COOK.